United States Patent
Huang

(10) Patent No.: US 12,457,943 B2
(45) Date of Patent: Nov. 4, 2025

(54) GARDEN SHEARS STRUCTURE

(71) Applicant: HO CHENG GARDEN TOOLS CO., LTD., Chang Hua Hsien (TW)

(72) Inventor: Yao-Chung Huang, Chang Hua Hsien (TW)

(73) Assignee: HO CHENG GARDEN TOOLS CO., LTD., Chang Hua Hsien (TW)

( * ) Notice: Subject to any disclaimer, the term of this patent is extended or adjusted under 35 U.S.C. 154(b) by 155 days.

(21) Appl. No.: 18/430,499

(22) Filed: Feb. 1, 2024

(65) Prior Publication Data

US 2025/0248342 A1    Aug. 7, 2025

(51) Int. Cl.
*A01G 3/02*    (2006.01)

(52) U.S. Cl.
CPC .................................. *A01G 3/021* (2013.01)

(58) Field of Classification Search
CPC .......... A01G 3/02; A01G 3/021; A01G 3/025; A01G 3/0251; B23B 13/14; B26B 13/18; B26B 13/26; B26B 13/28
USPC ........................... 30/234, 250–254, 261, 262
See application file for complete search history.

(56) References Cited

U.S. PATENT DOCUMENTS

| | | | | |
|---|---|---|---|---|
| 578,453 | A * | 3/1897 | Hollingsworth | B26B 29/04 81/417 |
| 1,436,603 | A * | 11/1922 | Philbert | A01G 3/0251 30/251 |
| 1,758,781 | A * | 5/1930 | Burger | A01G 3/0475 30/144 |
| 1,760,232 | A * | 5/1930 | Finken | A01G 3/02 30/239 |
| 6,385,852 | B1 * | 5/2002 | Huang | A01G 3/0255 30/249 |
| 2022/0061224 | A1 * | 3/2022 | Huang | A01G 3/021 |

* cited by examiner

*Primary Examiner* — Jennifer S Matthews

(57) ABSTRACT

A garden shears structure includes a first grip, a second grip, and an elastic component. The garden shears structure uses the elastic component to push open the first and second grips and reach the purpose of opening and closing the blade part and the blade jaw part for shearing. When the upper and lower seats of the elastic component are stretched and pushed by the spring, the upper and lower seats can move along the shaft column to achieve a linear displacement effect, so that the elastic component can provide the first and second grips with opening and closing actions in the compressed and stretched state along the axis, thereby making the use of the shears smoother.

6 Claims, 9 Drawing Sheets

GARDEN SHEARS STRUCTURE

BACKGROUND OF THE INVENTION

Field of the Invention

This invention relates to a garden shears, in particular to a garden shears structure that can prevent the spring from separating and has smooth use.

Description of the Related Art

The conventional garden shears mainly include a corresponding blade part and a jaw part, and the cutting purposes of the blade and the jaw parts are achieved through the opening and closing of the two grips. The conventional garden shears usually have a spring between the two grips, and the elasticity of the spring will push the two relaxed grips to open, further opening the blade part and the jaw part. When applying force to the two grips, the blade and the jaw parts are closed to achieve the shearing effect. However, most of the springs commonly used in conventional garden shears are compression springs or V-shaped spring pieces, because a shaft bolt is used as the axis for opening and closing when the two grips are opened, and the spring will expand and compress in an arc state, so that the spring moves off-axis and is easily twisted or deviated. This disadvantage not only greatly reduces the smooth use of the shears, but also makes the spring easily bounce away from the two grips, causing inconvenience in use, which is the technical problem that this invention intends to solve.

SUMMARY OF THE INVENTION

The technical problem to be solved by this invention is to provide a garden shears structure in view of the above-mentioned deficiencies in the conventional technology. In particular, the elastic component with a linear telescopic displacement effect is used to help improve the opening and closing of the shears. It can cut smoothly while preventing the spring from jumping out of the garden shears.

This invention provides a garden shears structure including a first grip, a second grip, and an elastic component. A grooving is provided at one end of the first grip, a first shaft hole and a second shaft hole are provided penetrating the grooving, the first grip covers a first knife body, the first knife body has a blade jaw part extending from the grooving, the grooving further accommodates a second knife body, the second knife body is provided with a shaft perforation that communicates with the first shaft hole and is pivotally connected through a first shaft bolt, one end of the second knife body is provided with a blade part corresponding to the blade jaw part, the other end of the second knife body is provided with a connection hole and a link hole. One end of the second grip is provided with an assembly part pivotally connected to the second shaft hole of the first grip, a linking part is provided on the inside of the second grip adjacent to the assembly part, one end of the linking part is assembled with the link hole of the second knife body, and a connection part is protruding from the inner side of the second grip adjacent to the other end. The elastic component has an upper seat, a lower seat, an shaft column, and a spring. The shaft column is passed through between the upper and lower seats, the upper and lower seats are provided with telescopic movement with the shaft column as the axis. Both ends of the spring are inserted between the upper and lower seats, used as the elastic power for the telescopic movement of the upper and lower seats. The upper seat is swingably pivoted to the link hole of the second knife body, and the lower seat is swingably pivoted on the connection part of the second grip.

Preferably, a long hole is provided on the outside of the first grip to communicate with the grooving, the long hole is equipped with a push button, the push button has a buckle part assembled from the long hole into the grooving. The second knife body is provided with a fastening part, and the buckle part and the fastening part can be connected to each other through the pushing action of the push button to form the close positioning state of the blade jaw part and the blade part.

Preferably, two shrapnel are provided on both sides of the buckle part and are positioned by the two shrapnel and the long hole.

Preferably, the second grip covers a handle body, a groove is provided on the inside of the second grip adjacent to the assembly part, one end of the linking part is assembled into the groove and is pivotally connected to the handle body, so that the linking part can swing freely in the groove, and the other end of the handle body facing the first grip is equipped the connection part.

Preferably, the upper seat and the lower seat both have a shaft part with a reduced diameter at one end, and a through slot is provided axially through the shaft part. The shaft column is passed through between the through slot of the upper and lower seats. Both ends of the spring are inserted between the shaft parts and respectively abut against the upper seat and the lower seat.

Preferably, the shaft column is further covered with a pad body, the pad body is between the two shaft parts.

Compared to the conventional arts, the garden shears structure of this invention uses the elastic component to push open the first and second grips and reach the purpose of opening and closing the blade part and the blade jaw part for shearing. Especially when the upper and lower seats of the elastic component are stretched and pushed by the spring, the upper and lower seats can move along the shaft column to achieve a linear displacement effect, so that the elastic component can provide the first and second grips with opening and closing actions in the compressed and stretched state along the axis, thereby making the use of the shears smoother. At the same time, the upper and lower seats are restricted by the shaft column, so that the spring can be truly confined between the upper and lower seats, further preventing the spring from springing away from the shears and greatly improving the stability of the structure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Figure 1:
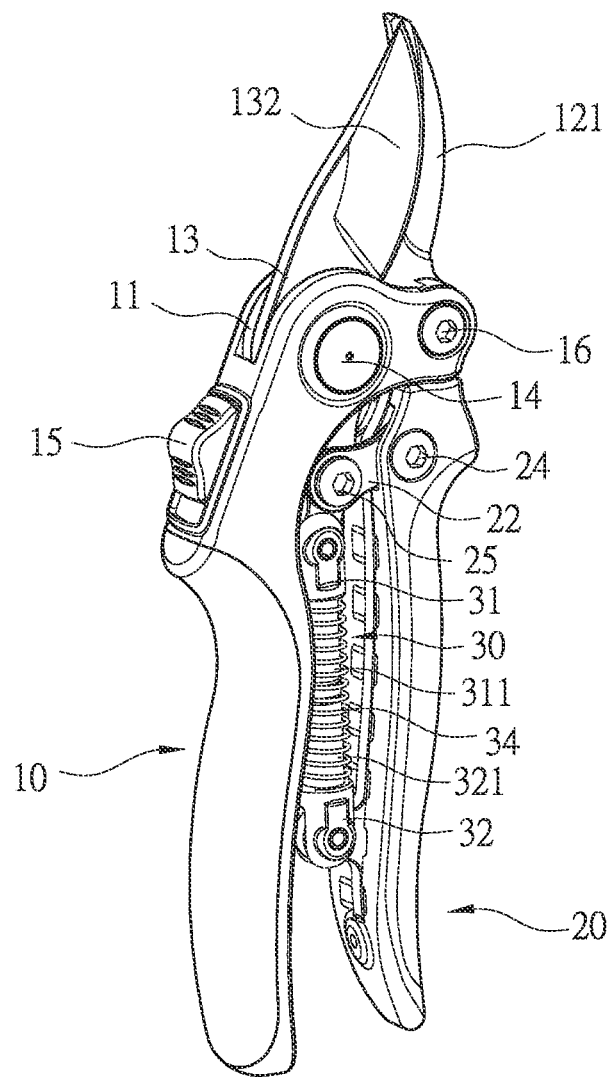
FIG. 1 is a three-dimensional view of this invention.

First, as shown in FIGS. 1-4, a garden shears structure includes a first grip 10, a second grip 20, and an elastic component 30. A grooving 11 is provided at one end of the first grip 10, a first shaft hole 111 and a second shaft hole 112 are provided penetrating the grooving 11, the first grip 10 covers a first knife body 12, the first knife body 12 has a blade jaw part 121 extending from the grooving 11, the grooving 11 further accommodates a second knife body 13, the second knife body 13 is provided with a shaft perforation 131 that communicates with the first shaft hole 111 and is pivotally connected through a first shaft bolt 14, one end of the second knife body 13 is provided with a blade part 132 corresponding to the blade jaw part 121, the other end of the second knife body 13 is provided with a connection hole 133 and a link hole 134, a recessed fastening part 135 is provided adjacent to the connection hole 133, a long hole 113 is provided on the outside of the first grip 10 to communicate with the grooving 11, the long hole 113 is equipped with a push button 15, the push button 15 has a buckle part 151 assembled from the long hole 113 into the grooving 11, and two shrapnel 152 are provided on both sides of the buckle part 151 and are positioned by the two shrapnel 152 and the long hole 113.

The second grip 20 covers a handle body 21, one end of the handle body 21 is provided with an assembly part 211, the other end is provided with a connection part 212 protruding toward the first grip 10, the assembly part 211 is pivotally connected to the second shaft hole 112 of the first grip 10 through a second shaft bolt 16, a groove 23 is provided on the inside of the second grip 20 adjacent to the assembly part 211 for pivoting a linking part 22, one end of the linking part 22 is assembled into the groove 23 and is pivotally connected to the second grip 20 and the handle body 21 through a third shaft bolt 24, so that the linking part 22 can swing freely in the groove 23, and the other end of the linking part 22 is equipped with a fourth shaft bolt 25 pivoted in the connection hole 133 of the second knife body 13.

The elastic component 30 has an upper seat 31, a lower seat 32, an shaft column 33, and a spring 34. The upper seat 31 and the lower seat 32 both have a shaft part 311 and 321 with a reduced diameter at one end, and a through slot 312 and 322 is provided axially through the shaft part 311 and 321, the shaft column 33 is passed through between the through slot 312 and 322 of the upper and lower seats 31 and 32, the upper and lower seats 31 and 32 are provided with telescopic movement with the shaft column 33 as the axis, the shaft column 33 is further covered with a pad body 331, the pad body 331 is between the two shaft parts 311 and 321, both ends of the spring 34 are inserted between the shaft parts 311 and 321 of the upper and lower seats 31 and 32, and respectively abut against the upper seat 31 and the lower seat 32, the spring 34 is used as the elastic power for the telescopic movement of the upper and lower seats 31 and 32, the upper seat 31 is swingably pivoted to the link hole 134 of the second knife body 13 using a first latch 313, the lower seat 32 utilizes a second latch 323 to be swingably pivoted on the connection part 212 of the handle body 21.

Figure 2:
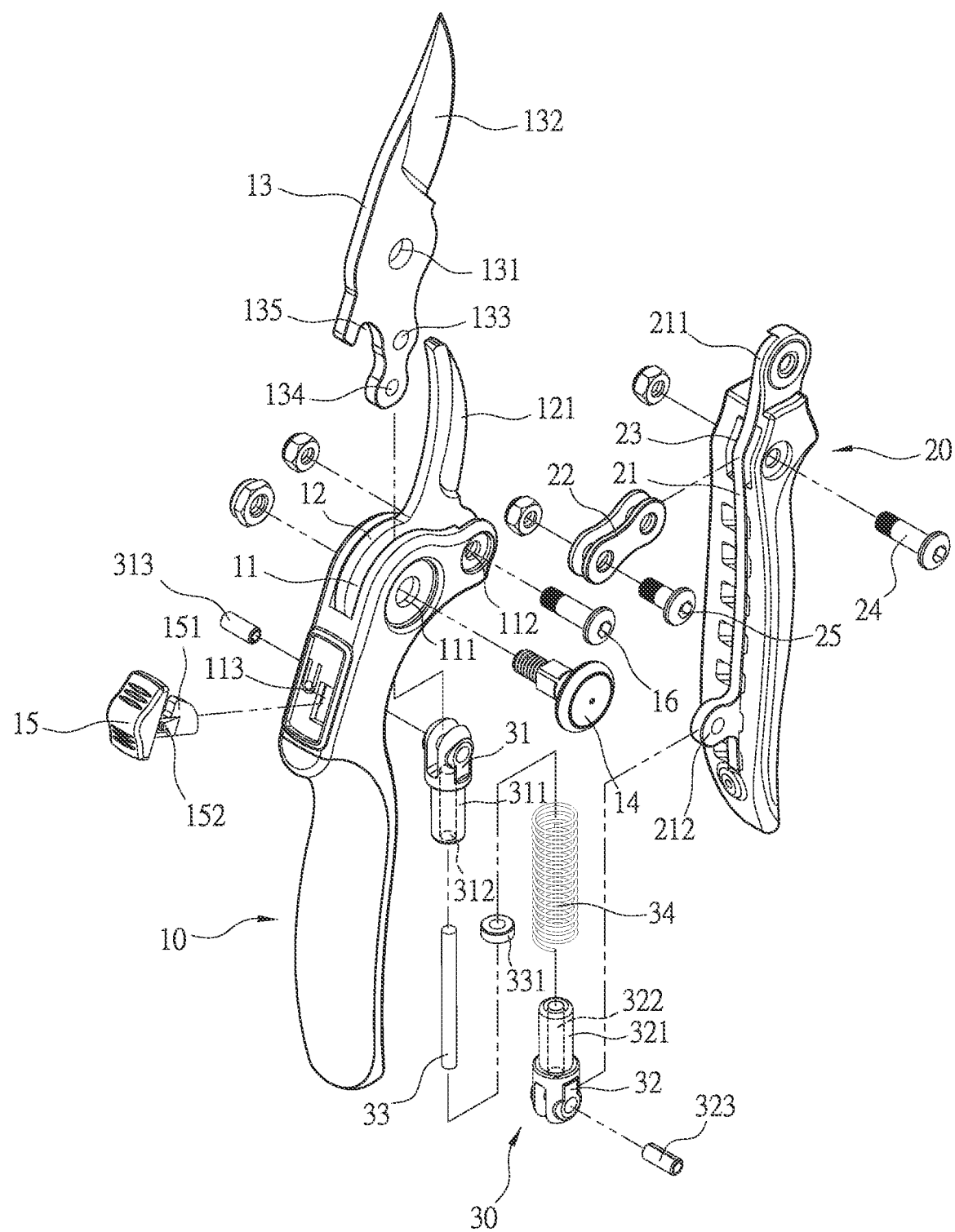
FIG. 2 is an exploded view of this invention.
Figure 3:
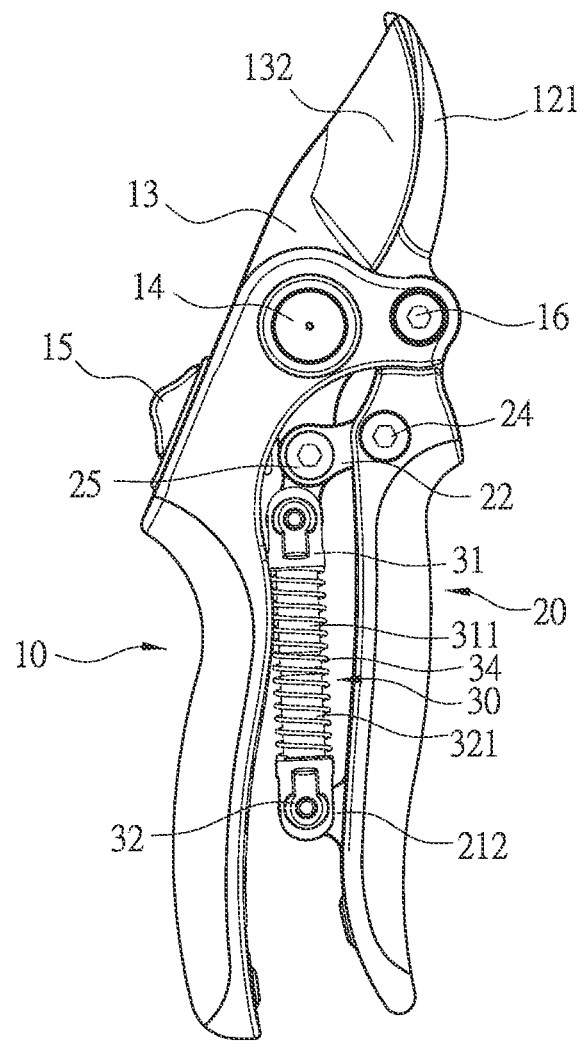
FIG. 3 is a front view of this invention.
Figure 4:
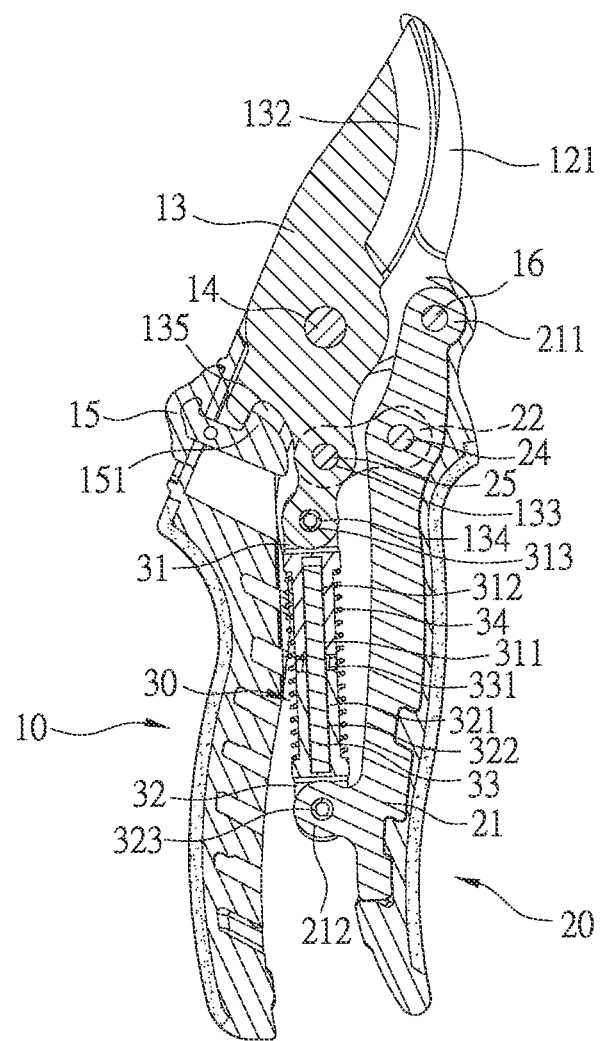
FIG. 4 is a combined cross-sectional view of this invention.

The structural composition can be seen from FIGS. 2-4. The second knife body 13 is located in the grooving 11, and the first shaft bolt 14 is used to pass through the first shaft hole 111 and the shaft perforation 131 to pivotally connect, so that the blade part 132 of the second knife body 13 can open and operate the blade jaw part 121 with the first shaft bolt 14 as the axis to achieve the cutting effect of the shears. The assembly part 211 of the second grip 20 is pivoted to the second shaft hole 112 of the first handle second grip 20 using the second shaft bolt 16. The other end of the component linking part 22 which is assembled in the groove 23 is pivotally installed in the connection hole 133 of the second knife body 13 cooperating with the fourth shaft bolt 25. The second grip 20 is further used to control the shearing action of the second blade body 13. When the blade part 132 of the second knife body 13 forms a closed state with the blade jaw part 121 through the operation of the second grip 20, the buckle part 151 and the fastening part 135 of the second knife body 13 can be connected to each other through the pushing action of the push button 15, and form the close positioning state of the blade jaw part 121 and the blade part 132. The upper seat 31 of the elastic component 30 is pivotally mounted on the link hole 134 of the second knife body 13 in conjunction with the first latch 313, and then the lower seat 32 is pivoted to the connection part 212 adjacent to the bottom of the second grip 20 using the second latch 323, thereby completing the structure of the garden shears structure.

Figure 5:
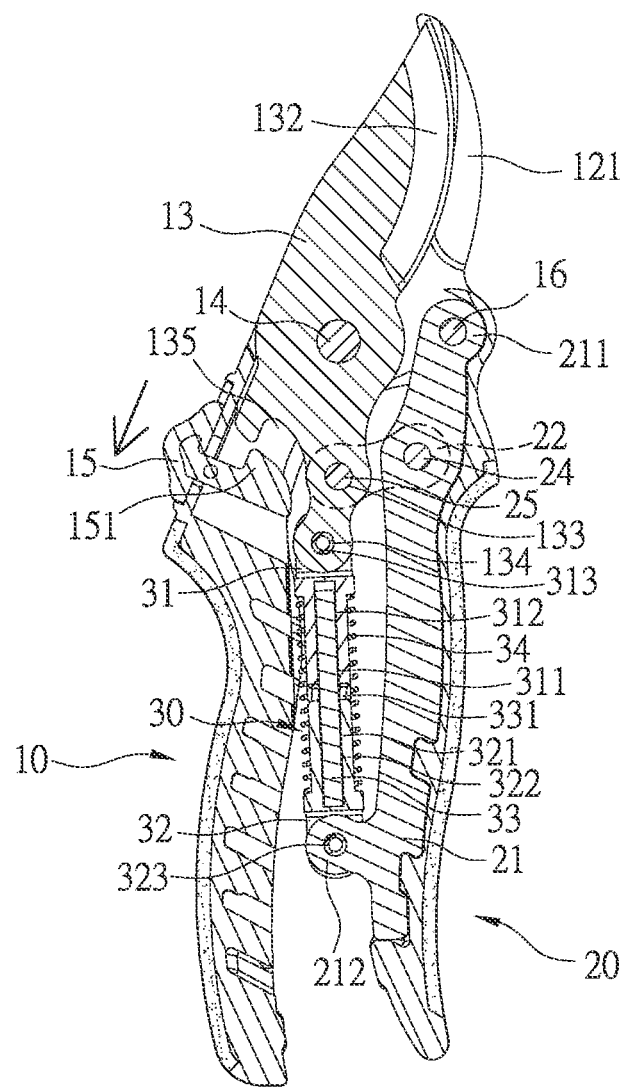
FIG. 5 is a schematic diagram showing the operation that displaces the push button to separate from the buckle.
Figure 6:
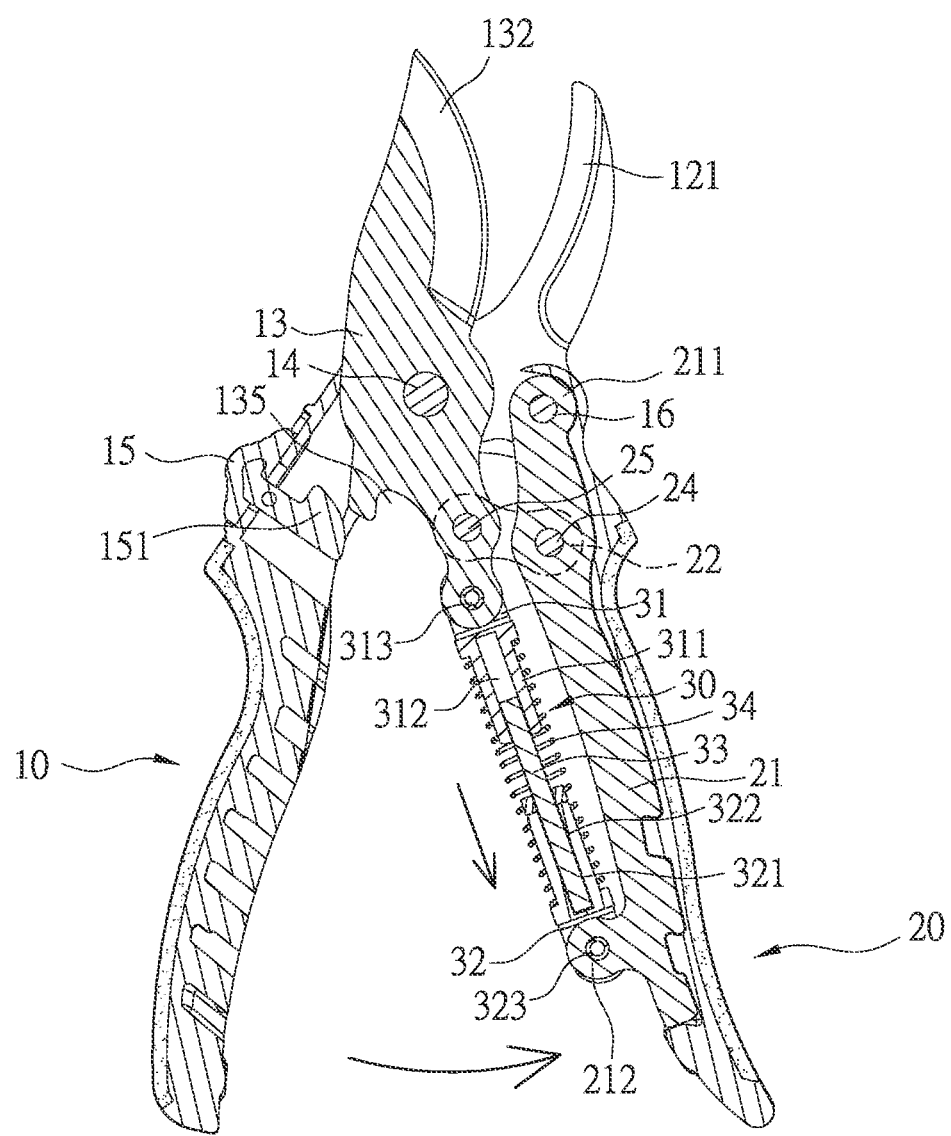
FIG. 6 is a cross-sectional view showing the elastic component of this invention driving the shears to open.
Figure 7:
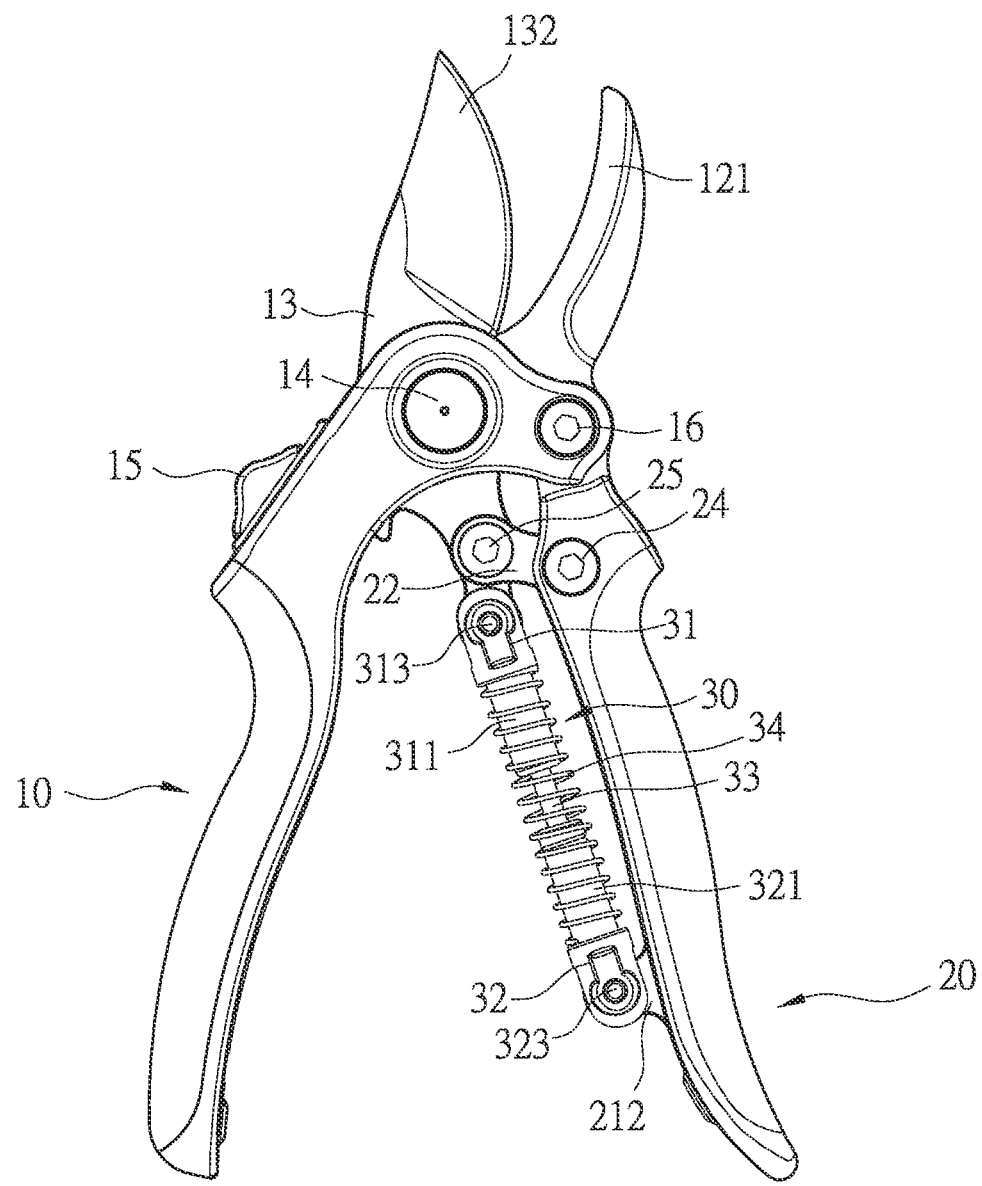
FIG. 7 is a schematic diagram showing the elastic component of this invention driving the shears to open.

The actual use state of the structure can be seen from FIGS. 5-7. When the buckle part 151 of the push button 15 is away from the fastening part 135 to form a positioning state, and the first and second grips 10 and 20 are released, the elastic component 30 uses the spring 34 to push the upper and lower seats 31 and 32 to expand and displace along the shaft column 33, thereby pushing the second grip 20 outward to open. The linking part 22 drives the second knife body 13 to move, so that the blade part 132 is separated from the blade jaw part 121 to form an open state, and then the first and second grips 10 and 20 are pressed to move the blade part 132 closed toward the blade jaw part 121 to form a shearing state, whereby the first and second grips 10 and 20 are pushed and released to achieve the cutting purpose of the garden shears structure.

Figure 8:
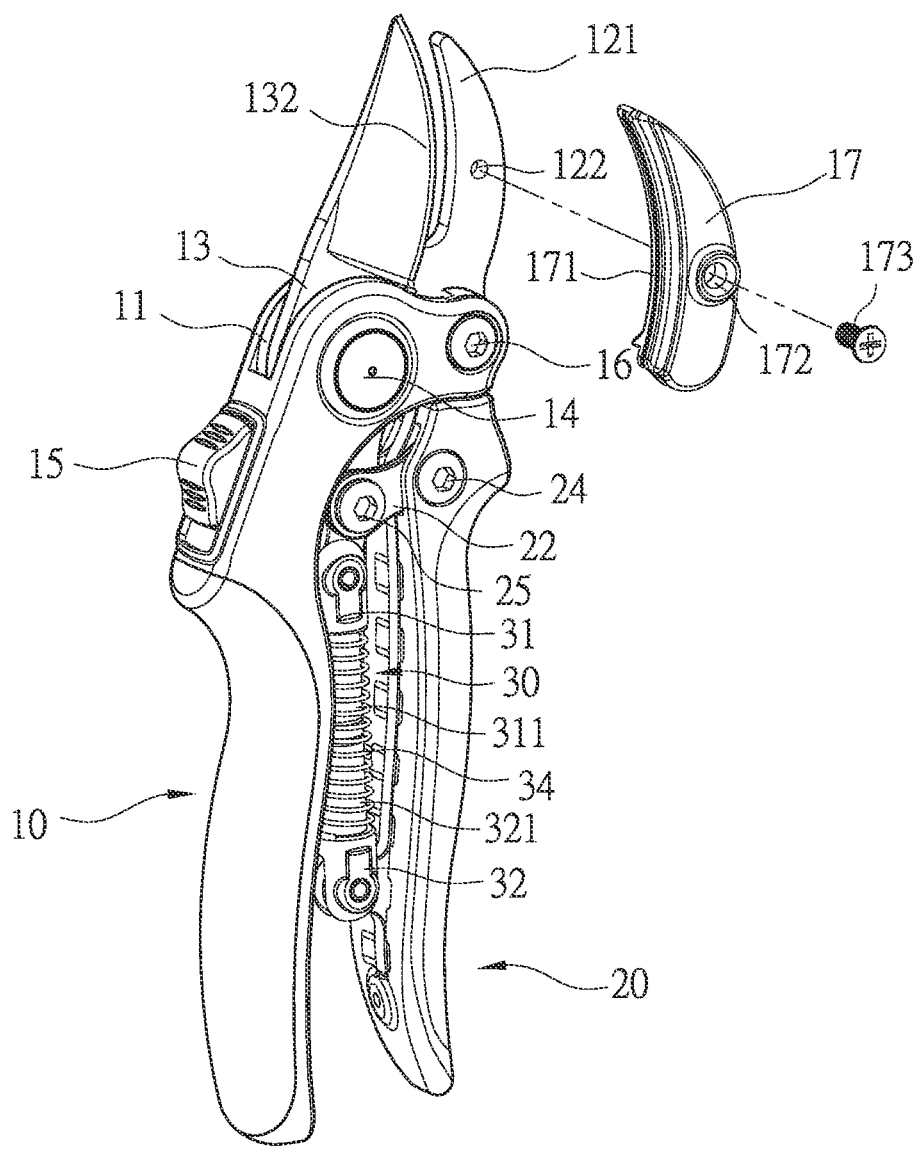
FIG. 8 is an exploded view of another embodiment of this invention.
Figure 9:
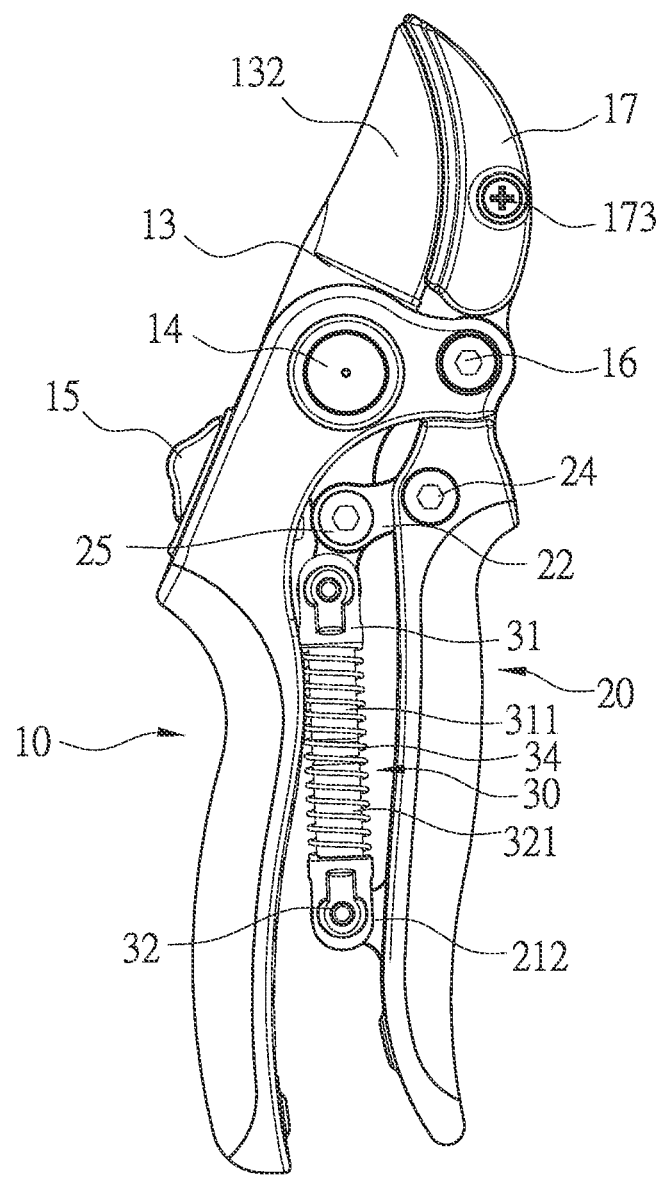
FIG. 9 is a schematic diagram of another embodiment of this invention.

Another embodiment is shown in FIGS. 8-9. The blade jaw part 121 can be further equipped with an anvil body 17, and the blade jaw part 121 is provided with a threading hole 122. The anvil body 17 has a slotting 171 for being sleeved on the outside of the blade jaw part 121, and a combination hole 172 is provided through the slotting 171. Then, a bolt 173 is used to screw through the combination hole 172 and the threading hole 122 to complete the installation of the anvil body 17.

The structure of the above-mentioned specific embodiments has the following benefits. The garden shears structure of this invention uses the elastic component 30 to push open the first and second grips 10 and 20 and reach the purpose of opening and closing the blade part 132 and the blade jaw part 121 for shearing. Especially when the upper and lower seats 31 and 32 of the elastic component 30 are stretched and pushed by the spring 34, the upper and lower seats 31 and 32 can move along the shaft column 33 to achieve a linear displacement effect, so that the elastic component 30 can provide the first and second grips 10 and 20 with opening and closing actions in the compressed and stretched state along the axis, thereby making the use of the shears smoother. At the same time, the upper and lower seats 31 and 32 are restricted by the shaft column 33, so that the spring 34 can be truly confined between the upper and lower seats 31 and 32, further preventing the spring 34 from springing away from the shears and greatly improves the stability of the structure.

What is claimed is:

1. A garden shears structure comprising:
   a first grip, wherein a grooving is provided at one end of the first grip, a first shaft hole and a second shaft hole are provided penetrating the grooving, the first grip covers a first knife body, the first knife body has a blade jaw part extending from the grooving, the grooving further accommodates a second knife body, the second knife body is provided with a shaft perforation that communicates with the first shaft hole and is pivotally connected through a first shaft bolt, one end of the second knife body is provided with a blade part corresponding to the blade jaw part, the other end of the second knife body is provided with a connection hole and a link hole;
   a second grip, wherein one end of the second grip is provided with an assembly part pivotally connected to the second shaft hole of the first grip, a linking part is provided on an inside of the second grip adjacent to the assembly part, one end of the linking part is assembled with the link hole of the second knife body, and a connection part is protruding from the inside of the second grip adjacent to the other end; and
   an elastic component, wherein the elastic component has an upper seat, a lower seat, an shaft column, and a spring, the shaft column is passed through between the upper and lower seats, the upper and lower seats are provided with telescopic movement with the shaft column as an axis, the spring is inserted between the upper and lower seats which provides elastic power for the telescopic movement of the upper and lower seats, the upper seat is swingably pivoted to the link hole of the second knife body, and the lower seat is swingably pivoted on the connection part of the second grip.

2. The garden shears structure of claim 1, wherein a long hole is provided on an outside of the first grip to communicate with the grooving, the long hole is equipped with a push button, the push button has a buckle part assembled from the long hole into the grooving, the second knife body is provided with a fastening part, and the buckle part and the fastening part are connected to each other through a pushing action of the push button to form a close positioning state of the blade jaw part and the blade part.

3. The garden shears structure of claim 1, wherein two shrapnel are provided on both sides of the buckle part and are positioned by the two shrapnel and the long hole.

4. The garden shears structure of claim 1, wherein the second grip covers a handle body, a groove is provided on the inside of the second grip adjacent to the assembly part, one end of the linking part is assembled into the groove and is pivotally connected to the handle body, the linking part can swing freely in the groove, and the other end of the handle body facing the first grip is equipped with the connection part.

5. The garden shears structure of claim 1, wherein one end of the upper seat and the lower seat both have a shaft part with a reduced diameter, and a through slot is provided axially through the shaft part, the shaft column is passed through between the through slot of the upper and lower seats, both ends of the spring are inserted between the shaft parts and respectively abut against the upper seat and the lower seat.

6. The garden shears structure of claim 5, wherein the shaft column is further covered with a pad body, the pad body is located between the two shaft parts.

* * * * *